United States Patent [19]

Cuomo

[11] Patent Number: 5,574,699
[45] Date of Patent: Nov. 12, 1996

[54] FIBER OPTIC LEVER TOWED ARRAY

[76] Inventor: Frank W. Cuomo, 108 Wannamoisett Rd., East Providence, R.I. 02914

[21] Appl. No.: 547,273

[22] Filed: Oct. 31, 1983

[51] Int. Cl.$^6$ .............................. G02B 6/02; H04R 1/02; H04R 15/00
[52] U.S. Cl. .................. 367/149; 367/154; 367/169; 385/15; 385/123
[58] Field of Search .................. 73/653, 655; 350/96.15, 350/96.29, 96.33; 367/20, 79, 153, 154, 166, 169, 171, 172, 149

[56] References Cited

U.S. PATENT DOCUMENTS

| | | | |
|---|---|---|---|
| 3,273,447 | 9/1966 | Frank | 367/149 |
| 3,327,584 | 6/1967 | Kissinger | 73/655 |
| 3,831,137 | 8/1974 | Cuomo | 73/653 |
| 3,997,230 | 12/1976 | Secreton | 367/154 X |
| 4,115,753 | 9/1978 | Shojenko | 367/154 X |
| 4,183,010 | 1/1980 | Miller | 367/171 X |
| 4,235,113 | 11/1980 | Carome | 73/655 |
| 4,313,192 | 1/1982 | Nelson et al. | 367/79 X |
| 4,363,115 | 12/1982 | Cuomo | 367/154 |
| 4,405,198 | 9/1983 | Taylor | 367/169 X |
| 4,477,887 | 10/1984 | Berni | 367/20 |

OTHER PUBLICATIONS

Swenson et al., Design and Construction of Cables for Sensor Systems, Sea Technology, Nov. 1973, pp. 29–32.
Usher et al. The Design of Miniature Wideband Seismometers Geophy, J. R. As Soc. (1978 Dec.) No. 3, pp. 605–613.

Primary Examiner—Charles T. Jordan
Assistant Examiner—Brian S. Steinberger
Attorney, Agent, or Firm—Michael J. McGowan; Prithvi C. Lall; Michael F. Oglo

[57] ABSTRACT

A small diameter towed acoustic line array comprising a plurality of miniature fiber optic lever hydrophones spaced at preselected locations along the array and held in place by fiber holders. The array hydrophones are enclosed within a tubular outer sheath which is filled with an acoustically transparent fluid. The hydrophones respond to either the pressure mode or the pressure gradient mode, each hydrophone further comprising at least one receiving and one transmitting optic fiber of the same diameter, a covering sheath, a clear elastomer and a small reflector. The information received is transmitted to and processed by a beamformer external to the array.

5 Claims, 1 Drawing Sheet

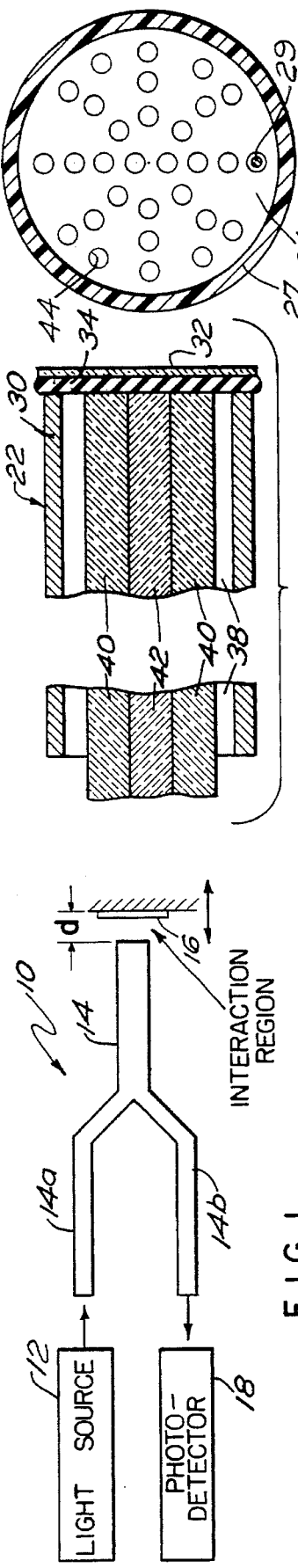
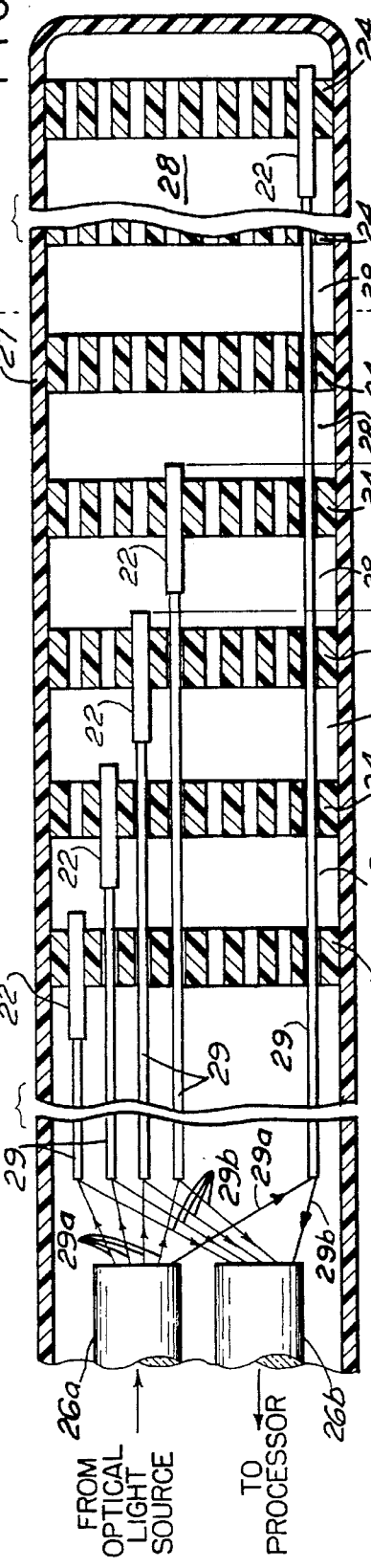
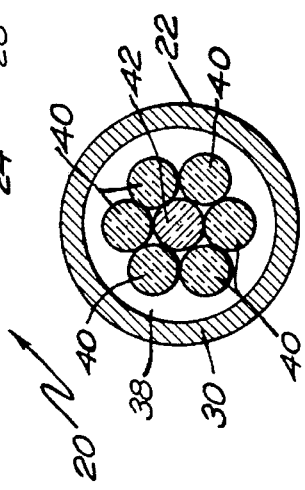
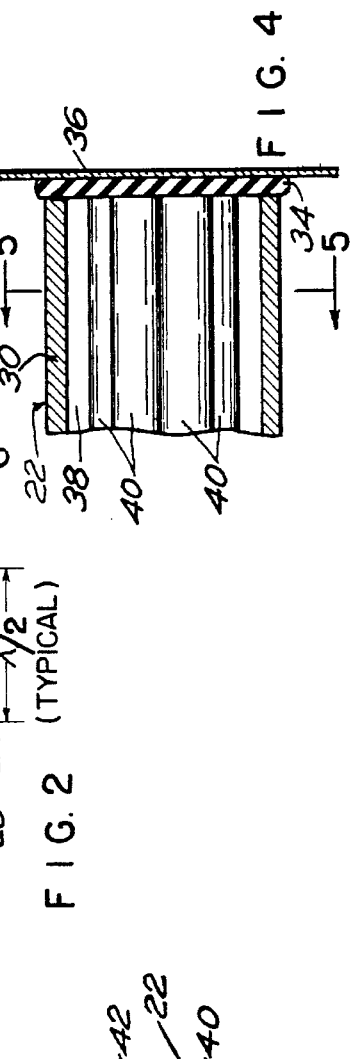

FIBER OPTIC LEVER TOWED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to towed fiber optic acoustic line arrays and more particularly to a small diameter, passive line array employing optical fiber bundles of varying length housed within a fluid filled tubular outer sheath, each bundle having a miniature fiber optic lever hydrophone terminating the distal end thereof.

(2) Description of the Prior Art

The utilization of fiber optic hydrophones to form acoustical towed arrays was previously described in U.S. Pat. No. 4,115,753 issued to Shajenko and in co-pending U.S. patent application, Ser. No. 531,794. Such hydrophones are used primarily because they permit significant reduction in the present minimum towed line array size of approximately one inch in diameter, reduction in the number of wires required to deliver power to presently used piezoceramic elements, and improved reliability and sensitivity. A less than ½ inch diameter disposable line array is described in co-pending U.S. patent application Ser. No. 531,794. However, low cost, long service life and simplicity are not always provided by the arrays described in the above cited references while such attributes are stressed in the present invention.

SUMMARY OF THE INVENTION

Accordingly, it is a general purpose and object of the present invention to provide a miniature fiber optic hydrophone based on the principles of the fiber optic lever. Such hydrophones are then used within a small diameter acoustical towed line array to yield a simple, economical and reliable array assembly comprising a plurality of these totally passive, acousto-optical detectors, the individual outputs of which are suitable for generating steerable beams because amplitude and phase information from each transducer can be individually processed by a beamformer external to the array. It is a further object that such arrays incorporating fiber optic hydrophones have sensors that are passive in the sense that no power is required at the wet end of the array. Another object is that the array transducers be relatively insensitive to tensile stresses and motions of the array normal to the flow direction. A still further object is that elements should be insensitive to static pressure and temperature variations during operational deployment. Still another object is that the towed array of this invention provide these features while remaining economical, reliable and acoustically responsive.

These objects are accomplished with the present invention by providing a passive, small diameter, towed acoustic line array comprising a plurality of miniature fiber optic lever hydrophones placed at preselected spacing and held in position by fiber holders. The hydrophones and holders are enclosed within a tubular outer sheath and all remaining array voids are filled with an acoustically transparent fluid which makes the array neutrally buoyant. Each miniature hydrophone further comprises at least one transmitting fiber and at least one receiving fiber surrounded by a small tubular sheath. The distal ends of the identical diameter fibers are connected by means of an optically clear elastomer to a single pressure sensing element such as a reflective surface sensitive to pressure variations in an acoustic field. The connection of the fiber ends to the pressure sensing element is such that impinging acoustic pressure variations cause a corresponding displacement of the sensing element which proportionally varies the reflected light intensity thereby modulating the light signal. The resulting array has low sensitivity to static pressure variations, ambient temperature and tensile stresses while allowing pressure or pressure gradient operation.

A more complete understanding of the invention and many of the attendant advantages thereto will be readily appreciated as the same becomes better understood by reference to the following detailed description when considered in conjunction with the accompanying drawings wherein:

BRIEF DESCRIPTION OF THE DRAWINGS

FIG. 1 shows a typical fiber optic lever hydrophone arrangement.

FIG. 2 shows a cross-sectional side view of a fiber optic lever towed array built in accordance with the teachings of the present invention.

FIG. 3 shows a cross-sectional side view of a typical fiber optic lever hydrophone of the pressure type.

FIG. 4 shows a cross-sectional side view of an alternate fiber optic lever hydrophone of the pressure gradient type.

FIG. 5 shows a cross-sectional end view of the transducer of FIG. 4 taken along section 5—5 thereof.

FIG. 6 shows a front view of a typical hydrophone holder as viewed along section 6—6 of FIG. 2.

DESCRIPTION OF THE PREFERRED EMBODIMENT

The fiber optic lever transducer utilized herein generally evolved from a concept originally described in U.S. Pat. Nos. 3,327,584 (Kissinger) and 3,273,447 (Frank), and later utilized in my U.S. Pat. No. 3,831,137 to develop a pressure gradient hydrophone. A typical fiber optic lever transducer 10 such as shown in FIG. 1 includes four basic components; a light source 12, a fiber optic light guide bundle 14, a pressure sensing element 16 such as a moveably mounted reflective surface sensitive to pressure variations in the acoustic field, and a photodetector 18. The optical fibers of bundle 14 further comprise a light transmitting bundle 14a and a light receiving bundle 14b. Each of bundles 14a and 14b may contain very few fibers or hundreds depending on desired hydrophone configuration and light level requirements. Bundle 14 is arranged at the distal end of the transducer so as to obtain high sensitivity relative to the displacement of pressure sensing element 16 while at the proximal end bundle 14 is separated into smaller diameter bundles 14a and 14b which connect to source 12 and photodector 18, respectively. The intensity of the reflected light in bundle 14b varies according to the displacement of reflector 16 thus providing a modulated light signal which is then converted to a proportional electrical signal by photodector 18 which is then transmitted to beamforming electronics.

A plurality of miniature hydrophones which, use the principles of the fiber optic lever hydrophones shown in FIG. 1, are then used to construct a small diameter towed acoustic line array 20, as shown in FIG. 2. Array 20 further comprises a plurality of miniature hydrophones 22, spaced along array 20 based on a preselected relationship such as a $\lambda/2$ spacing, log-periodic spacing or the like. Note that while the $\lambda/2$ spacing shown in FIG. 2 appears to be relatively close, towed line arrays are most often used to sense a range of low frequencies, i.e., <1 kHz and hence even for the top end of this frequency range, $\lambda/2$ is approximately 0.75 meters whereas the array diameter is significantly less than one inch. Hydrophones 22 are fixedly held in position by means of a corresponding plurality of hydrophone holders 24 of plastic, fiberglas or the like. Array 20 receives light from a light source (which need not be coherent) by means of fiber bundle 26a and returns the modulated light signals to the array signal processor by means of fiber bundle 26b. Outer tubular sheath 27, which is a plastic material such as PVC, encloses all array components fixedly attaching to each holder 24 by means of adhesive. All remaining array voids are then filled with an acoustically transparent, low density, fluid 28 such as Shell Sol #71 or the like in order to provide neutral buoyancy for the array. Each hydrophone 22 further is located at the distal end of a sub-bundle 29 which comprises a plurality of equal length transmit fibers 29a from bundle 26a and a plurality of receive fibers 29b from bundle 26b of the same length as the corresponding transmit fibers 29a for that hydrophone. All transmit and receive fibers are of equal diameter. Each hydrophone is thus the termination of a sub-bundle having a preselected length. The resulting plurality of sub-bundles (and hence hydrophones), each of a different length, forms an array 20 spaced as described above.

Substantial improvements have been made in the present array over the fiber optic lever type transducers described in the above-cited U.S. patents. These improvements include: a reduction in the number of fibers to only a few together with an arrangement of the input/output fibers at the distal end which improves hydrophone sensitivity while decreasing array diameter; a novel coupling of a miniature mirror reflector to the distal end of the fibers by means of an optically clear potting material such as Epo-tek, Type 394 Thermoplastic Polymer or any other optically clear silicone compound possessing a compressibility similar to that of water; and the special arrangement of the new miniature sensors thus formed into an array which provides simple, passive operation in either the pressure or pressure gradient modes while requiring a minimum total length of fiber to construct the array. The hydrophone elements in the array are spaced, e.g., approximately one half wavelength apart, based on the velocity of sound in seawater in order to generate acceptable beam patterns. Each hydrophone 22 is fixedly mounted to a holder 24 by adhesive bond such that only the distal end is allowed to respond to the acoustic wave via the mirror/potting material assembly in contact with the optical fiber ends.

FIGS. 3 and 4 show cross-sectional views of the distal ends of two hydrophone 22 configurations, whereby the diameter of a mirror is either matched to (FIG. 3) or made substantially larger than (FIG. 4) the diameter of the outer hydrophone sheath 30. Sheath 30 may be of any suitable material capable of forming a small thin wall tube, although stainless steel hypodermic tubing is preferred. Mirror 32, being the same size as sheath 30, is attached to the fiber bundle and sheath 30 distal ends by optically clear silicone elastomer 34 as shown in FIG. 3. FIG. 4 shows the same arrangement except that a mirror 36, being larger than (generally twice the diameter of) sheath 30, is so attached. For each configuration, an cement 38 such as Epo-tek, Type 301 Epoxy or the like fills the remaining void between receive fibers 40, transmit fibers 42 and sheath 30. While one transmit fiber and six receive fibers are shown as preferred, it is noted that the quantity of each fiber may be varied without deviating from the teachings of the present invention. By way of example, a miniature hydrophone may have seven 100 micron fibers arranged as shown in FIG. 5. A 0.050" diameter sheath 30 is placed thereover and cemented thereto using cement 38. A mirror 32, also 0.050" in diameter is attached to the fiber and sheath distal ends by a bead of optical potting material such that the diameter of the hydrophone does not exceed 0.050 inches. In FIG. 3 hydrophone 22 operates in the pressure mode while in FIG. 4 hydrophone 22 operates in the pressure gradient mode. It should also be noted that hydrostatic pressure variations due to water depth changes will shift the operating point of the device in FIG. 3 by increasing or decreasing gap "d", as shown in FIG. 1, due to compression variations. However, these static changes can be accounted for and corrected a priori for any given depth and do not affect hydrophone sensitivity because of the wide range of linearity inherent in the device. In FIG. 4 this problem is minimal because a large portion of the static pressure acts on both sides of mirror 36 at all times. It is further noted that, unlike other proposed designs, the present invention; requires no electrical power at the wet end, permits progressive reduction of the overall length of the optical fiber sub-bundles 29 from right to left and is insensitive to array motion as well as tensile stresses within the fibers because the optical fibers are only used to guide the light waves while the acousto-optical interaction occurs outside the distal end of the fibers. An incoherent source, 12, can be used to illuminate the input fibers while each photodetector 18 in the array detects individual sensor outputs for further processing and beam-forming. Although the distal end of the fibers, as shown in FIG. 5 illustrates a seven fiber arrangement, this number can be varied without deviating from the teachings of the present invention. The requirement that the compressibility of the potting material approximate that of water can be obtained utilizing any of the silicone compounds now available in the optical industry.

FIG. 6 shows a typical hydrophone holder 24 having a preselected number of apertures 44 therethrough for passing any of the plurality of sub-bundles 29 while each hole 44 is sized to securely hold a hydrophone 22 at its preselected location along the array.

The advantages and new features of the improved fiber optic lever hydrophone 22 include: compatibility with present towed array designs; a reduction in the number of optical fibers required in the transmit and receive bundles of each hydrophone thereby decreasing the overall diameter of the array without loss of sensitivity; the use of clear optical elastomer compounds to couple the miniature mirror reflector to the fiber and sheath distal ends, thereby eliminating the need for additional components to hold the reflector in place and thus reducing hydrophone size and complexity; and sensitivity to static pressure variations is almost negligible for the pressure sensors because the potting compound thickness is very small. For pressure gradient type devices static pressure variations are non-existent. Sensors are intensity-modulated and are thus not affected by temperature changes because the optical fibers are only used to carry light to and from an external interaction region. The hydrophones can be used as pressure or pressure gradient devices by the simple change in the dimensions of the mirror. These sensors are totally passive and sensors are not affected by tensile stresses within the fibers nor by motions of the array. Simplicity, low cost and high reliability is attained.

Construction of an acoustical towed array utilizing optical hydrophones having phase modulated type optical sensors has been described in U.S. Pat. No. 4,235,113. The present invention however uses novel, miniature, intensity-modulated sensors to improve the construction of a small diameter, towed, low frequency array. In addition the fiber optic lever type sensor 22 is compatible with constructing a small diameter, low cost towed array.

What has thus been described is a passive, small diameter towed acoustic line array comprising a plurality of miniature fiber optic lever hydrophones held by hydrophone holders at preselected locations. These hydrophones are covered by a tubular outer array sheath and all remaining array voids are filled with acoustically transparent fluid. Each hydrophone further comprises at least one transmitting fiber and at least one receiving fiber, the distal ends of which are connected via a clear elastomer to a single pressure sensing element such as a reflective surface sensitive to pressure variations in an acoustic field. The connection of the fiber ends to the sensing element is such that impinging acoustic pressure variations cause a corresponding displacement of the sensing element which varies the reflected light intensity in proportion thereto.

Obviously many modifications and variations of the present invention may become apparent in light of above teachings. For example: The implementation of this concept can be varied by changing the number of fibers chosen per hydrophone and their arrangement at the distal end. While FIG. 5 shows a seven-fiber arrangement, other combinations can be used such as a two-fiber arrangement or any other that will retain the sensitivity and small dimensions of the array. Various acoustically transparent fluids may be used provided the desirable characteristic of having sound transmissability equivalent to that of water is retained. Hydrophone spacing may also be varied such as by using log-periodic spacing as taught by my U.S. Pat. No. 4,363,115. A central strength member or a plurality of circumferential strength members may also be used if drag forces are expected to be large, i.e., for a very long array.

In light of the above, it is therefore understood that within the scope of the appended claims, the invention may be practiced otherwise than as specifically described.

What is claimed is:

1. A towed array for receiving acoustic signals from a remote target, said array comprising:

a light source for providing light signals;

a plurality of miniature, fiber optic lever hydrophone means, each having a diameter of not more than 1300 microns and being spaced at preselected locations along said array, for receiving said acoustic signals and intensity modulating said light signals in proportion thereto, each of said plurality of miniature fiber optic lever hydrophone means further comprising, at least one receive fiber from said receiving fiber bundle, at least one transmit fiber from said transmit fiber bundle, said transmit fibers being positioned adjacent to said at least one receive fiber, all fiber distal ends being aligned so as to form a sub-bundle, a first tubular sheath having an outside diameter of not more than 1300 microns and an inside diameter which slides freely over said sub-bundle, one end of which is aligned with said aligned fiber ends, a cement, filling the space inside said first sheath and around said fibers, for bonding said aligned fibers and said first sheath together, miniature reflector means, positioned a preselected distance "d" from and parallel to the plane formed by said aligned fiber and said first sheath ends, and a bead of optically clear elastomer having a compressibility substantially the same as water, said elastomer filling the gap between said reflector means and said fiber end plane, for moveably bonding said reflector means to said fibers whereby the light exiting from said receive fiber passes through said bead while propagating to said reflector, reflects back from said reflector, and propagates back through said bead and into said transmit fibers;

a plurality of hydrophone holder means, one each attached to one of said plurality of miniature hydrophone means, for fixedly holding each said hydrophone means at its preselected array location;

a bundle of receiving optical fibers, at least one fiber of which is connected to each of said plurality of hydrophones, for receiving said light signals from said light source and providing said light to each said miniature hydrophone, each said at least one receiving fiber having a length corresponding to the spacing along the array of the corresponding miniature hydrophone;

a bundle of transmit optical fibers, at least one fiber of which is connected to each of said plurality of hydrophones, for receiving said modulating light signals from each said hydrophone and transmitting said modulated light signals to a remote signal processor, each said at least one transmit fiber having a length corresponding to the spacing along the array of the corresponding miniature hydrophone;

a second tubular sheath of outside diameter not greater than three eights of an inch, said second sheath enclosing said miniature hydrophone means, said hydrophone holder means, said receiving fibers and said transmit fibers, said second sheath fixedly attaching to each of said plurality of holder means thereby forming internal voids where not so in contact, for providing strength and protection to the array; and an acoustically transparent fluid, filling said internal voids within said second sheath, for transmitting said acoustic pressure from said remote target, through said second sheath to said plurality of miniature hydrophones while making said array neutrally buoyant;

whereby an acoustic line array is formed having a diameter of not more than said three eights of an inch second sheath outside diameter and therefore a corresponding, substantially reduced turbulent flow-noise profile.

2. A towed array according to claim 1 wherein said reflector means further comprises a miniature mirror having a diameter equal to that of said second sheath so that said hydrophone operates in the pressure mode.

3. A towed array according to claim 1 wherein said reflector means further comprises a miniature mirror having twice the diameter of said second sheath so that said hydrophone operates in the pressure gradient mode.

4. A towed array according to claim 2 wherein each of said plurality of hydrophone holder means further comprises a disk having a plurality of apertures therethrough, one each corresponding to one of said plurality of hydrophones, each said aperture having a diameter such that one of said second sheaths fixedly attaches therethrough while said apertures freely pass any of said sub-bundles, each said disk having an outside diameter such that said disk fits within and attaches to said first sheath.

5. A towed array according to claim 3 wherein each of said plurality of hydrophone holder means further comprises a disk having a plurality of apertures therethrough, one each corresponding to one of said plurality of hydrophones, each said aperture having a diameter such that one of said second sheaths fixedly attaches therethrough while said apertures freely pass any of said sub-bundles, each said disk having an outside diameter such that said disk fits within and attaches to said first sheath.

* * * * *